June 8, 1965  J. N. BAUM ETAL  3,187,745
ELECTRODES

Filed Aug. 1, 1961  2 Sheets-Sheet 1

INVENTORS
BENJAMIN H. DENNISON, JR.
& JEROME N. BAUM

BY Hurwitz and Rose

ATTORNEYS

June 8, 1965  J. N. BAUM ETAL  3,187,745
ELECTRODES
Filed Aug. 1, 1961  2 Sheets-Sheet 2
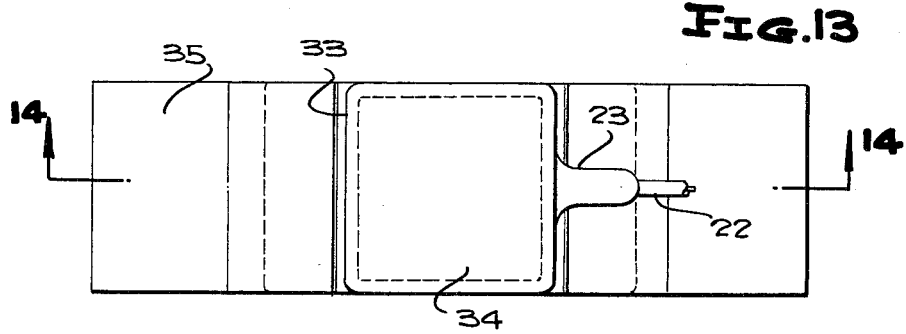
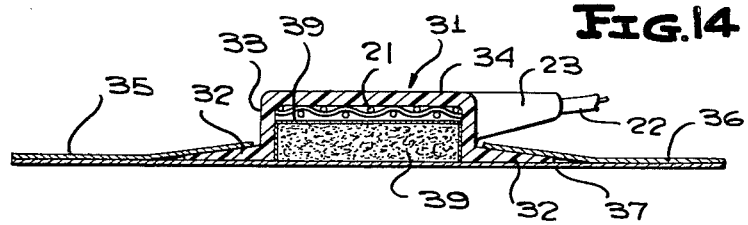
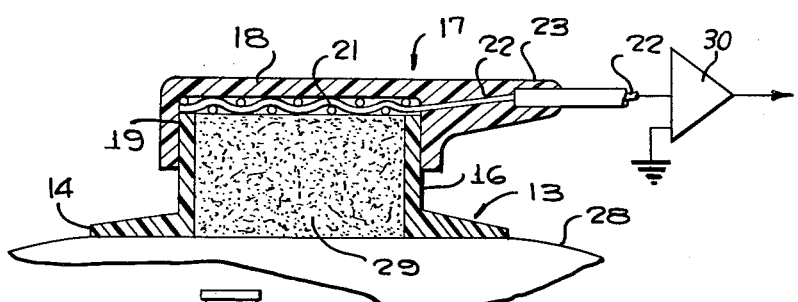
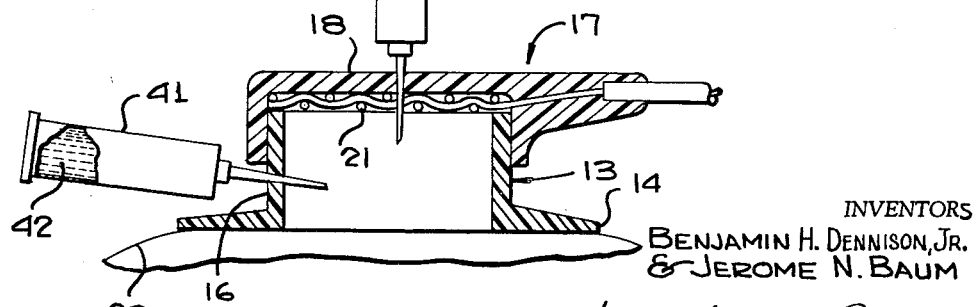
INVENTORS
BENJAMIN H. DENNISON, JR.
& JEROME N. BAUM
BY Hurwitz and Rose
ATTORNEYS

3,187,745
ELECTRODES

Jerome N. Baum, Alexandria, and Benjamin Herman Dennison, Jr., Arlington, Va., assignors to Melpar, Inc., Falls Church, Va., a corporation of Delaware
Filed Aug. 1, 1961, Ser. No. 128,416
2 Claims. (Cl. 128—2.06)

The present invention relates generally to electrodes suitable for mounting on animals or humans and, more particularly, to such electrodes adapted to provide constant electrical connections between the wearer and the electrical readout apparatus, even while the wearer is moving considerably.

In measuring electric potentials generated by cardiac or other muscle, or the brain of an animal or human, a metal electrode is generally placed in direct contact with the skin by placing an electrolytic paste, gel or a fluid between the metal surface and the skin. It has been found that this type of electrode is not acceptable for subjects who are moving to any great extent, such as ambulatory patients, and human or animal subjects undergoing dynamic tests in rockets, space craft, etc. As the subject moves, contact between the skin and electrode is not constantly maintained, causing the signal picked up by the electrode to fade and contain considerable noise. Many of the prior electrode elements have not operated in optimum manner for space flights, where the subject is preferably equipped with transducers long before their operation is desired. This frequently results in evaporation of the electrolyte, thus increasing the resistance between the subject and the electrode, and causing sufficiently great attenuation of the feeble signal generated to render it unintelligible, even after amplification. Space flight equipment for measuring voltages generated by human and animal subjects have frequently necessitated the use of shielded cable on the subject, because of the feebly generated signal. This has proven to be a cause of considerable nuisance to the subject and installation personnel. Also, the adverse effects of the leads, straps and constrictions necessary in the prior devices greatly reduce their utility for ambulatory patients, as well as dynamic test subjects.

Our invention obviates these defects of the prior art, by employing a transducer with a metal electrode remotely located from the skin at all points. An electrical connection between the skin and the electrode is established with an electrolyte permeating the volume between the skin and metal electrode. With this arrangement, the resistance between the skin and metal electrode remains substantially constant for great amounts of body movement because the same area of electrolyte is always contacting the body.

There exists in the prior art, an electrode employing a cup shaped metal electrode member having a lip adapted to contact the skin. Electrolyte is placed in the cup, which is then secured to the skin by a collodion. The utilization of collodion is not desirable since it is difficult to apply and inconvenient to handle. This electrode is not suitable for many situations in which the subject is undergoing dynamic influences, and is not readily stored preparatory to use. Since the metal electrode is making substantial contact with the skin in the prior device, normally a large percentage of the generated current flows directly between the metal and skin. Thus, movement by the subject results in considerable variation in skin to electrode resistance, with attendant fading and noise in the signal. As the subject moves, the amount of electrolyte between the electrode and the skin varies, causing a further change in resistance to increase the inaccuracy of the electrode measurements.

To obviate these undesirable features of the prior art, the present invention employs, in one embodiment, a resilient annular member for holding the electrolyte, and a disc shaped member, to which the metal electrode is secured and maintained remotely from the skin of the subject. The annular member is secured to the subject in any appropriate manner and electrolyte is inserted therein. The electrolyte gel is inserted in the annular member by filling, and the disc is secured to the annulus so the space between the electrode and skin is filled with electrolyte. In the alternative, the electrolyte is contained in a rupturable capsule which is broken after the disc is placed on the annular member.

In another embodiment of the present invention, the electrode is mounted on the upper surface of a cap shaped member having flexible adhesive secured thereto. A protective cover for the adhesive stretches across the opening in the cap, thus providing a space in which a capsule, containing the electrolyte, may be located, or which may be filled with electrolyte by a syringe after the unit is secured in place on the subject. With this type of structure, the units may be manufactured, stored and used in strip form, which is especially convenient for personnel applying the units to the subject.

In both embodiments, the entire unit is resilient, since the element is fabricated from a flexible rubber or plastic, such as Silastic, and a wire mesh is employed as the electrode, thus enabling the unit to conform to the skin contours as the subject moves. Accordingly, the area of electrolyte contacting the skin remains constant, as does the skin to mesh impedance. Also, annoyance to the subject is minimized, contrary to the prior art metal cup.

By employing a structure having two separate parts, one for containing the electrolyte, and the other for holding the electrode, the present invention permits the unit to be secured to the subject long before the electrolyte is released. This is highly desirable in test operations, where release of the electrolyte greatly in advance of the operation is annoying to the subject, and can result in considerable electrolyte evaporation prior to time of desired use, thereby increasing resistance to such an extent that the electrode signal is too feeble and variable to be useful.

It has been found that with the present invention, there is no necessity to employ shielded cable on the subject, because the signal picked-up is of sufficient amplitude to be detected above the noise pick-up level.

It is an object of the present invention to provide a new and improved electrode for human and animal subjects, particularly adapted for subjects undergoing dynamic influences.

It is another object to provide a new and improved electrode wherein the electrical resistance between the skin of the subject tested and the lead wires remains substantially constant, even when the subject is moving to a considerable extent.

A further object is to provide an electrode that is installable on a subject long prior to the time it is to function, wherein resistance between the subject and the lead wires does not become excessive before the electrode is desired to function.

An additional object is to provide an electrode for monitoring voltages generated by the brain or muscles, e.g. cardiac, of a human or animal which does not necessitate the use of straps, constructions or shielded cables to provide the amplifier with the proper signals.

It is a further object of the present invention to provide an electrode particularly adapted for use on subjects undergoing dynamic conditions which is easy to utilize, inexpensive, and yet highly reliable.

The above and still further objects, features and advantages of the present invention will become apparent upon consideration of the following detailed description of one specific embodiment thereof, especially when taken in conjunction with the accompanying drawings, wherein:

FIGURE 11 is an illustration of the manner in which the structures of FIGURES 1–4 are assembled on a subject of interest.

FIGURE 12 is an illustration of one method for inserting electrolyte into the embodiments of FIGURES 1–10.

FIGURE 13 is a plane view of another embodiment of the present invention; and

FIGURE 14 is a side sectional view of the structure illustrated in FIGURE 13 taken along the lines 14—14.

Figure 1:
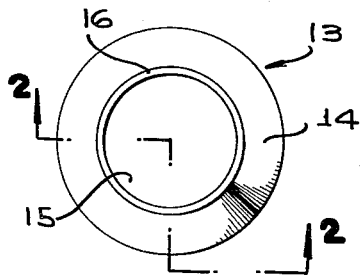
FIGURE 1 is a top view of one embodiment of the annular base member according to the present invention.
Figure 3:
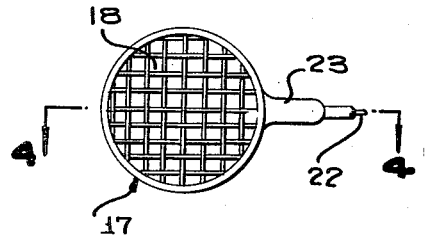
FIGURE 3 is a top view of the cap adapted for use with the base of FIGURES 1 and 2.
Figure 2:
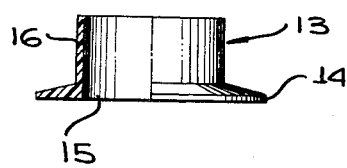
FIGURE 2 is a partial sectional side view of the structure disclosed in FIGURE 1 taken along the lines 2—2.
Figure 4:
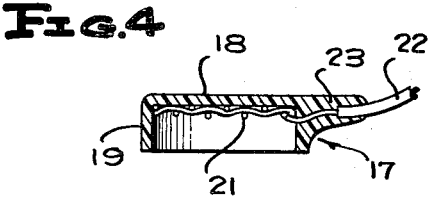
FIGURE 4 is a sectional side view of the structure illustrated in FIGURE 3 taken along the lines 4—4.
Figure 5:
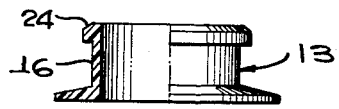
FIGURE 5 is a partial sectional side view of the base of a modification of the structure of FIGURE 1.
Figure 6:
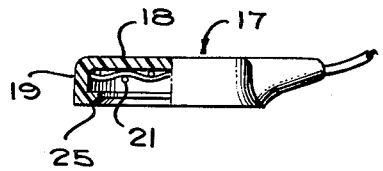
FIGURE 6 is a partial sectional side view of the cap adapted for use with the structure of FIGURE 5.

FIGURES 1 and 2 are illustrations of the top and side views, respectively, of the container member 13, according to one embodiment of the present invention wherein FIGURE 2 is a partial sectional view of FIGURE 1 taken along the lines 2—2. Container 13 comprises an annular base member 14 having a flat bottom adapted to contact the skin of the subject, to which it is applied and an enclosed, circular aperture 15, having side walls 16 extending therefrom to form a well, wherein the top of the well is in contact with member 14, and the bottom thereof is open. The cap 17, illustrated in FIGURES 3 and 4 in plane and side views respectively, includes a circular disc 18 having a side wall 19 extending at right angles thereto. Wire mesh metal electrode 21, made of any suitable material such as the noble metals silver, gold or platinum, is secured to the interior of cap 17, and to the underside of disc 18 by cement. An aperture is provided in cap 17, through which lead 22 extends and establishes electrical contact between the mesh electrode 21, and the necessary amplifiers 30, FIGURE 11, employed with the electrode structure. Tit 23, constructed of flexible electrically insulating material, e.g. rubber or plastic, is secured to cap 17, and provides the physical connection between lead 22 and the metal electrode 21. Container 13 and cap 17 are both manufactured from a suitable resilient electrically insulating material, preferably similar to tit 23. In certain embodiments, it is preferable for base 13 and cap 17 to be made of such material that is puncturable and self sealing, since a hypodermic syringe must be inserted therein and withdrawn to insert the electrolyte.

In use, cap 17 is secured to container 13 by cement, so that the interior of sidewalls 19 engage the exterior of sidewalls 16, and metal electrode 21 contacts the upper edge of sidewalls 16.

Figure 7:
FIGURE 7 is a partial sectional side view of another modification of the base.
Figure 8:
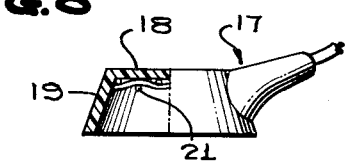
FIGURE 8 is a partial sectional side view of the cap adapted to be utilized with the base of FIGURE 7.
Figure 9:
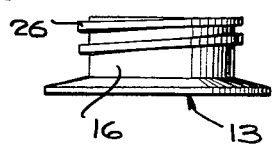
FIGURE 9 is a partial sectional side view of an additional modification of the base.
Figure 10:
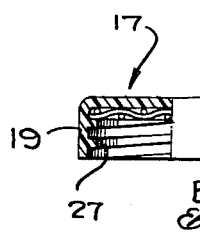
FIGURE 10 is a partial sectional side view of the cap utilized with the base of FIGURE 9.

FIGURES 5 to 10 indicate modifications in the container member 13, and cap member 17, which may be employed to more easily accomplish fastening thereof to each other. In the container 13 of FIGURE 5, a lip 24 is provided on the upper edge of sidewall 16 to accommodate a flange 25 on the sidewall 19 of cap 13 of FIGURE 6. Flange 25 extends parallel to disc 18 of cap 13, and inwardly toward the aperture thereof opposite electrode 21. Since both the container 13 and cap 17 are constructed of resilient material, flange 24 securely engages the upper surface of lip 25, and the cap and container are secured to each other solely by friction. In the assembly of FIGURES 7 and 8, the sidewall 16 of container 13 is tapered inwardly from base member 14, and sidewall 19 of the cap 17 is tapered outwardly from base member 18. The tapers and relative position of sidewalls 16 and 19 when the container in the cap are assembled are such that the sidewalls engage each other solely by friction, and retain the electrolyte between the skin surface of the subject surrounded by base member 14 and the metal electrode 21. In the embodiments of FIGURES 9 and 10, the sidewall 16 of container member 13 is provided with suitable threads 26 for engaging the recess threaded portion 27 of cap 17, which is formed on the interior sidewalls thereof. Thus, the liquid electrolyte is secured within the annular region between the sidewalls of container 13 and is maintained in place by a threaded relationship between container 13 and cap 17. With the modifications of FIGURES 5–10, employing only friction to secure container 13 to cap 17, the necessity for cement to secure these elements together is obviated.

FIGURE 11 illustrates the complete electrode unit when assembled and cemented to the skin 28 of the subject to which it is adhered. The electrolyte 29, preferably in the form of a gel having the trade-name Redux, is filled between the sidewalls 16 of container 13, having the underside of its base member 14 cemented to the skin 28 of the subject. The gel is filled slightly above the top of sidewalls 16, so that the complete volume between the skin 28 of the subject and wire mesh metal electrode 21 is filled, thereby establishing substantially constant electrical resistance between the skin 28 of the subject, and metal electrode 21, when cap 17 is secured to container 13, so that the top edges of sidewalls 16 engage the lower surface of electrode 21 and the interior sidewalls 19 of cap 17.

In the embodiment illustrated in FIGURE 12 it is essential that container 13 and cap 17 be constructed of a puncturable, self sealing material, e.g. Silastic, so that syringe 41 may be employed to fill the container 13 with electrolyte after the complete unit has been assembled on the subject. Syringe 41, containing liquid electrolyte 42, is inserted through container 13 so it pierces sidewall 16 thus enabling the electrolyte 29 to be filled in the volume between the skin 28 of the subject and mesh electrode 21. To ensure complete permeation of the electrolyte 42 through the enclosed volume and constant skin-to-electrode resistance, another syringe 43 is employed to pierce disc 18 and mesh 21, to withdraw substantial amounts of air from the space between skin 28 and disc 18. After the well formed by container 13 and disc 18 is filled with electrolyte, syringes 43 and 41 are removed in the order named, and wall 16 and cap 18 seal themselves so no electrolyte escapes. It is necessary for syringe 43 to be withdrawn first so that it will not withdraw electrolyte from the well.

FIGURES 13 and 14 are illustrations of another embodiment of the present invention, wherein FIGURE 14 is a sectional view of the structure illustrated in the plane view of FIGURE 13 taken along the line 14—14. In this embodiment, a substantially U-shaped cap member 31 made of a resilient, puncturable, self sealing material, such as employed for container 13 or cap 17, is provided with rectangular flanges 32 disposed at right angles to one edge of sidewalls 33. Metal electrode 21 is disposed interiorly of cap 13 and is secured to the interior surface of rectangular member 34, which forms the base of cap 31. Flexible, ventilated, adhesive strips 35 and 36 are secured on opposite sides of flanges 32. Strips 35 and 36, with flanges 32 comprise the base for the electrode which is adapted to be secured to the skin of the subject. On the underside of the thus formed base, a protective stripable cover 37 is provided, so the adhesive surface of strips 35 and 36 cannot become attached to foreign objects prior to the desired period of use. The relationship between strips 35 and 36 and flange member 32 with protective cover 37 is similar to the "Band-Aid" type construction, known for medical purposes. When cover 37 is removed, the unit is applied to the skin of the subject by adhesive on the undersides of strips 35 and 36, as shown in the drawings.

Prior to application of the electrode of FIGURES 13 and 14 to the subject, the electrolyte is retained in the space between electrode 21 and protective cover 37 by being enclosed in a capsule 39 or in a saturated sponge. After cover 37 is removed and the unit is placed on the skin of the subject, capsule 39 is broken by a water filled syringe inserted through the top surface 34 of cap 31 and wire mesh 21. The water added by the syringe where mixed with electrolyte 38, results in an electrolyte that completely fills the volume between the skin of the subject and mesh 21 to establish good, low resistance contact between the subject and lead 22. With this structure, electrolyte does not evaporate, because of its unexposed relationship to the air prior to utilization, and there is no necessity for maintaining a supply of electrolyte for utilization of personnel attaching the electrode to the subject. Of course, with this construction member 34 must be self-sealing when the syringe is removed.

When utilizing a sponge for electrolyte storage, the sponge is compressed between mesh 21 and cover 37 prior to application of the electrode to the subject. After cover 37 is removed and the electrode applied to the subject, the sponge expands sufficiently between the skin of the subject and mesh 21 to establish electric conduction between them through the stored electrolyte. With the sponge, evaporation is a minimum because the space between electrode 21 and protective cover 37 is completely enclosed, and little or no air is permitted to circulate therein to cause evaporation either prior or subsequent to electrode application.

In the alternative, electrolyte is inserted in the space between the skin of the subject and electrode member 21 by inserting a syringe through sidewall 33 into the aforementioned space. Accordingly, electrolyte fills the space and air is withdrawn by a further syringe, as illustrated in FIGURE 12 for the two piece construction. Since cap 31 is self-sealing, there is no leakage therefrom after the syringes have been removed and the electrolyte is retained in the electrode structure.

Thus, with the structure of FIGURES 13 and 14, a well is formed having its top engaging the surface of the subject and its bottom comprising disc member 34 and metal electrode 21 remotely disposed from the top of the well and the skin surface. Also this type unit may easily be manufactured in a series of elongated strips with one electrode unit secured to another, thus facilitating use and storage.

It is thus seen that in all of the disclosed embodiments, electrode 21 is always remotely disposed with relation to the skin of the subject and is maintained in place at the top of the well forming aperture 15, sidewalls 16, and disc 18. Since both container 13 and cap 17 are approximately the same resiliency as the skin of the animal or human subject, being fabricated from a resilient plastic or rubber, such as Silastic, any movement of the subject is followed by the electrode structure and the resistance between the skin 28 of the subject and metal wire mesh electrode 21 remains substantially constant because the contact area between the skin and electrolyte interface remains substantially constant. Since container member 13 may be installed long prior to performance of the particular test, without having electrolyte filled in the well, the unit can be rendered partially ready at the convenience of the subject and installation crew. The entire unit can be completely installed just prior to the accomplishment of a test, thus reducing the probability of evaporation to nil.

It should be apparent that the electrode of the present invention may be utilized for supplying electric currents to the body of the subject as well as for picking up voltages generated by it. For both uses, resistance between the skin of the subject and the metal mesh electrode remains substantially constant even while the subject is moving to a great extent. Thus, generated noise is a minimum and signal fading is greatly reduced. In supplying electric currents to the body, a given voltage will produce a uniform response.

While we have described and illustrated one specific embodiment of our invention, it will be clear that variations of the details of construction which are specifically illustrated and described may be resorted to without departing from the true spirit and scope of the invention as defined in the appended claims.

We claim:

1. In a system for deriving signals in response to voltages generated by the muscles of a human or animal subject without deriving significant noise even when the subject is moving, an electrode unit having a cup composed entirely of electrically insulating material, said cup including a substantially planar rim adapted to be secured to the skin of said subject, said rim defining the mouth of said cup, an amplifier electrically connected to be responsive to the signal picked up by said electrode unit, the improvement in said unit comprising: a single electrode mounted within said cup and completely removed from its mouth, an electrolyte completely filling the volume of said cup so that the only signal path between the skin of the subject and said electrode is through said electrolyte and the resistance of said path remains substantially constant despite movement of said subject.

2. In a system for deriving signals in response to voltage generated by the muscles of a human or animal subject without deriving significant noise even when the subject is moving, an electrode unit having a cup composed entirely of electrically insulating material having approximately the same flexibility as the skin of the subject, said cup including a substantially planar rim adapted to be secured to the skin of said subject, said rim defining the mouth of said cup, an amplifier electrically connected to be responsive to the signal picked up by said electrode unit, the improvement in said unit comprising: a single electrode mounted within said cup and completely removed from its mouth, said electrode covering approximately the same area as the mouth of said cup, an electrolyte completely filling the volume of said cup so that the only signal path between the skin of the subject and said electrode is through said electrolyte and the resistance of said path remains substantially constant despite movement of said subject.

References Cited by the Examiner

UNITED STATES PATENTS

| | | | |
|---|---|---|---|
| 542,508 | 7/95 | Van Tuyl | 128—172.1 |
| 2,493,155 | 1/50 | McMillan | 128—172.1 |
| 2,621,657 | 12/52 | Leech | 128—417 |
| 2,632,447 | 3/53 | Dobes | 128—417 |
| 2,718,224 | 9/55 | Apstein | 128—2.06 |
| 2,898,910 | 8/59 | Gross et al. | 128—156 |
| 2,948,767 | 8/60 | Johnson et al. | 136—90 |

RICHARD A. GAUDET, *Primary Examiner.*